United States Patent [19]

Mills

[11] Patent Number: 4,504,615

[45] Date of Patent: Mar. 12, 1985

[54] TREATING POLYMERS OF ETHYLENE

[75] Inventor: Kenneth R. Mills, Bartlesville, Okla.

[73] Assignee: Phillips Petroleum Company, Bartlesville, Okla.

[21] Appl. No.: 334,506

[22] Filed: Dec. 28, 1981

Related U.S. Application Data

[63] Continuation of Ser. No. 106,346, Dec. 21, 1979, abandoned.

[51] Int. Cl.$^3$ .................................................. C08K 5/13
[52] U.S. Cl. .................................... 524/291; 524/349; 524/385; 524/387; 524/388; 524/389; 526/84; 526/106; 526/352
[58] Field of Search .................. 526/84, 352, 106; 524/376, 377, 379, 388, 389, 291

[56] References Cited

U.S. PATENT DOCUMENTS

| | | | |
|---|---|---|---|
| 2,825,721 | 3/1958 | Hogan et al. | 526/106 |
| 2,956,983 | 10/1960 | Rindtorff et al. | 260/45.95 P |
| 2,962,488 | 11/1960 | Horne, Jr. | 260/45.95 P |
| 2,985,617 | 5/1961 | Salyer et al. | 260/45.75 R |
| 3,076,776 | 2/1963 | Findlay | 526/106 |
| 3,087,917 | 4/1963 | Scoggin | 526/67 |
| 3,219,622 | 11/1965 | Luciani et al. | 260/45.95 P |
| 3,282,891 | 11/1966 | Bown et al. | 260/45.95 S |
| 3,285,855 | 11/1966 | Dexter et al. | 260/45.85 S |
| 3,322,720 | 5/1967 | Dempsey et al. | 260/45.85 S |
| 3,337,495 | 8/1967 | Corbett et al. | 260/45.95 S |
| 3,458,552 | 7/1969 | Hauck et al. | 260/448 R |
| 3,536,689 | 10/1970 | Brand et al. | 528/481 |
| 3,622,521 | 11/1971 | Hogan et al. | 252/430 |
| 3,708,465 | 1/1973 | Dietrich et al. | 526/84 |
| 3,773,743 | 11/1973 | Ainsworth et al. | 524/389 |
| 3,864,307 | 2/1975 | Nast et al. | 524/324 |
| 3,941,747 | 3/1976 | Roth, Jr. et al. | 524/349 |
| 3,954,708 | 5/1976 | Rasberger et al. | 260/45.95 S |
| 4,013,622 | 3/1977 | DeJunas et al. | 260/45.95 S |
| 4,052,349 | 10/1977 | Turkey et al. | 260/17.2 |
| 4,059,563 | 11/1977 | Goto et al. | 260/45.95 H |
| 4,206,260 | 6/1980 | McMahon | 260/45.95 P |

OTHER PUBLICATIONS

Kirk–Othmer, vol. 8, pp. 294–301 (1965–2nd edition).

*Primary Examiner*—John Kight
*Attorney, Agent, or Firm*—A. W. Umphlett

[57] ABSTRACT

A method for treating polymers of ethylene which have been stabilized with hindered phenolic stabilizer to reduce the discoloration produced upon processing the stabilized polymer at elevated temperature wherein before completion of the processing at elevated temperature there is admixed with the stabilized polymer compositions at least one compound chosen from the group consisting of aliphatic hydroxy compounds and epoxy-containing compounds. In a preferred embodiment, the polymer of ethylene and aliphatic hydroxy compound are further admixed with water. In another embodiment of the invention the aliphatic hydroxy compounds contain from 1 to 4 hydroxyl groups and are water soluble.

A treated polymer of ethylene stabilized with hindered phenolic stabilizer that has been admixed with a compound chosen from the group consisting of aliphatic hydroxy compounds and epoxy-containing compounds. A composition of matter comprising a polymer of ethylene, hindered phenolic stabilizer, aliphtic hydroxy compound, and water.

7 Claims, No Drawings

TREATING POLYMERS OF ETHYLENE

This application is a continuation application of my copending application, Ser. No. 106,346, filed Dec. 21, 1979 now abandoned.

BACKGROUND OF THE INVENTION

This invention relates to polymers of ethylene. In one of its aspects this invention relates to stabilizing polymers of ethylene. In another of its aspects, this invention relates to polymers of ethylene containing a hindered phenolic stabilizer. In still another aspect of the invention it relates to improving the color of polymers of ethylene containing a hindered phenolic stabilizer when the polymers are processed at high temperatures.

Stabilizing polymers of ethylene using hindered phenolic compounds has been recognized to cause the problem of producing color in the stabilized polymers upon further high temperature treatment of these polymers. It has been conjectured that a possible source of the color can be the combination of catalyst residues and hindered phenolic stabilizers present in the finished resin. Whatever other factors influence the production of color, the presence of hindered phenolic stabilizer is recognized as contributory to the problem. It has now been found that coloration can be reduced or even eliminated while treating stabilized polymers of ethylene at temperatures of 500° F. or higher.

It is therefore an object of this invention to provide a method for decreasing or eliminating the development of color in stabilized polymers of ethylene upon treating the stabilized polymers at elevated temperature. It is another object of this invention to provide stabilized polymers of ethylene that are resistant to increasing of coloration upon being treated at elevated temperature.

Other aspects, objects and the various advantages of this invention will become apparent upon reading this specification and the appended claims.

STATEMENT OF THE INVENTION

According to this invention, a method is provided for treating polymers of ethylene that have been stabilized with hindered phenolic stabilizer so that discoloration upon processing the stabilized polymers at elevated temperature is reduced or eliminated. In the method, the stabilized polymeric compositions before completion of the processing at elevated temperature are admixed with at least one aliphatic hydroxy compound or epoxy-containing compound.

In an embodiment of the invention, the stabilized polymer of ethylene is admixed with at least one aliphatic hydroxy compound in combination with water.

In another embodiment of the invention, there are provided polymers of ethylene stabilized with hindered phenolic stabilizer that have been treated by admixing the stabilized compositions with epoxy-containing compounds, aliphatic hydroxy compounds, or mixtures of aliphatic hydroxy compounds and water.

In still another embodiment of the invention a composition of matter is provided that is composed of a polymer of ethylene, hindered phenolic stabilizer, aliphatic hydroxy compound, and water. This composition of matter shows resistance to the development of coloration upon being treated at elevated temperature.

The polymers of ethylene contemplated include normally solid ethylene homopolymers as well as copolymers and terpolymers of ethylene with a minor amount of a higher aliphatic 1-olefin containing 3–10 carbon atoms or a conjugated diolefin containing 4 or 5 carbon atoms. These polymers can be prepared in processes utilizing as catalysts compounds of metals of Groups IVB, VB and VIB of Mendelieff's Periodic Table, particularly chromium and titanium and most particularly supported chromium oxide catalysts such as disclosed in U.S. Pat. Nos. 2,825,721, 3,087,917, and 3,622,521, incorporated here by reference. The polymers are obtained in the form of powders (fluff) which are stabilized against the deleterious effects of heat and oxygen by admixture with a minor amount of suitable hindered phenolic stabilizer. Auxiliary stabilizers such as the dialkyl esters of thiodipropionic acid can also be present, e.g. dilaurylthiodipropionate (DLTDP) and distearylthiodipropionate.

One group of hindered phenolic stabilizers of interest in this invention can be represented by the formula:

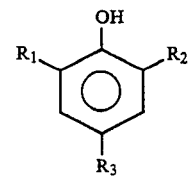

wherein $R_1$ and $R_2$ can be the same or different, each representing tertiary alkyl, cycloalkyl, aryl and alkylaryl radicals containing from 4 to about 10 carbon atoms and $R_3$ is a hydrogen atom or an alkyl group containing from 1 to about 4 carbon atoms. Specific examples of suitable compounds include 2,6-di-t-butyl-4-methylphenol (BHT), 2,6-di-t-butylphenol, 2,6-di-t-butyl-4-ethylphenol, 2,6-dicyclopentylphenol, 2,6-dicyclooctyl-4-methylphenol, 2-t-butyl-4-methyl-6-cyclohexylphenol, 2,6-dibenzyl-4-n-butylphenol, 2,6-di(1-naphthyl)phenol and mixtures.

Another group of hindered phenolic stabilizers of interest in this invention are the esters of hindered hydroxybenzoic acids and hindered hydroxyphenylalkanoic acids which can be represented by the formulae:

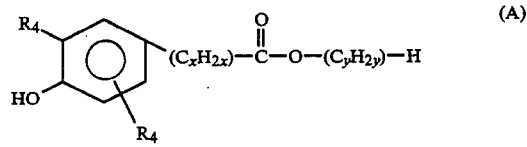

(A)

in which $R_4$ is an alkyl radical containing from 1 to about 6 carbon atoms, x is an integer of 0 to 6, and y is an integer of 6 to 30

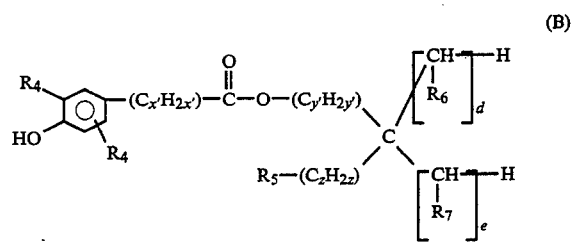

(B)

in which $R_5$ is hydrogen, hydroxy, alkanoyloxy or

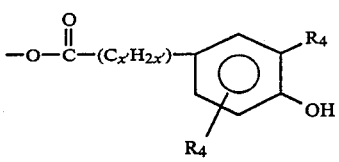

each of R$_6$ and R$_7$ is hydroxy, alkanoyloxy or

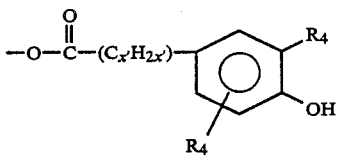

and R$_4$ is as defined above, x' an integer of 1 to 6, each of y', z d and e independently has a value of 0 to 6, at least one of y', z, d and e have a value other than 0 and the sum of d and e being no greater than 6 and being at least 1 when R$_5$ is hydrogen and the sum of y' and z being at least 1 when R$_5$ is other than hydrogen.

Examples of specific compounds of formulae A and B include n-hexyl 3,5-di-t-butyl-4-hydroxyphenylbenzoate, n-octadecyl 3,5-di-t-butyl-4-hydroxyphenylacetate, n-octadecyl-3-(3,5-di-t-butyl-4-hydroxyphenyl) propionate, ethyl-alpha-(4-hydroxy-3,5-di-t-butylphenyl) isobutyrate, ethylene glycol bis(3,5-di-t-butyl-4-hydroxyphenylacetate), 2-stearoyloxyethyl 7-(3-methyl-5-t-butyl-4-hydroxyphenyl)-heptanoate and tetrakis [methylene 3-(3,5-di-t-butyl-4-hydroxyphenyl) propionate] methane which has also been alternately named as tetrakis [methylene (3,5-di-t-butyl-4-hydroxyhydrocinnamate)] methane. Descriptions of these compounds and their preparation are disclosed in U.S. Pat. No. 3,285,855.

The organic aliphatic hydroxy compounds to be employed in this invention contain one to four hydroxyl groups, are water soluble and include alcohols containing from 1 to 6 carbon atoms, glycols containing from 2 to 7 carbon atoms, polymeric glycols having weight average molecular weights ranging from about 150 to about 800, and normally liquid, straight-chain triols containing from 3 to about 6 carbon atoms. By water soluble is meant that at least one part by weight of the compound is soluble in 100 parts by weight of water. Complete miscibility with water is preferred. Specific examples include methanol, ethanol, isopropanol, 2-methyl-pentanol-4, 1,2-ethanediol (ethylene glycol), 1,4-butanediol, 1,7-heptanediol, diethylene glycol, triethylene glycol, dipropylene glycol, polyethylene glycols having weight average molecular weights ranging from about 200 to about 800, polypropylene glycols having weight average molecular weights ranging from about 150 to about 700, 1,2,6-hexanetriol, and the like, pentaerythritol and the like and mixtures. A presently preferred compound because of availability, low toxicity, and relatively low cost is glycerol.

Although any amount will have an effect, the quantity of the water-soluble organic aliphatic polyhydroxy compound generally used in this invention ranges from about 0.01 to about 2 weight percent based on the weight of the ethylene polymer (100 to 20,000 ppm), preferably from about 0.01 to about 1 weight percent.

The weight ratio of the water to organic aliphatic hydroxy compound can vary from about 1:10 to 10:1. Generally, a weight ratio of about 1:1 is employed when the polymer is pretreated since wettability of the polymer is promoted and a free-flowing product is obtained. It is within the scope of the invention to add the aliphatic hydroxy compound or water mixture thereof to the semi-molten or molten polymer as it is being worked in an intensive mixer such as a Banbury mixer or as it is being passed through an extruder, particularly a devolatilizing extruder since the water mixture can be metered into a vent section of the extruder.

In another embodiment, ethylene polymer fluff after stabilization can be contacted with an epoxy polymer or epoxy compound prior to melt processing the mixture through an extruder or the like. The epoxy polymers are commercially available materials ranging from liquids to solids which can be prepared by reacting epichlorohydrin with a polyol such as bisphenol A as described in the second edition of Kirk-Othmer, Encyclopedia of Chemical Technology 8, 294–300 (1965).

Suitable epoxy polymers have epoxide equivalents of from about 150 to about 6,000 as determined according to ASTM D1652. Presently preferred polymers have epoxide equivalents from about 400 to about 900.

Among the epoxy compounds suitable for use in this invention are the epoxidized oils, e.g., triglycerides containing an epoxy group, which can be derived from natural and synthetic fats and oils or the unsaturated fatty acid esters of polyhydric alcohols which can be epoxidized by reaction with peracetic acid as described in U.S. Pat. No. 2,569,502, which issued Oct. 2, 1951 to Swern et al. Specific examples include epoxidized oils obtained from lard oil, olive oil, castor oil, peanut oil, cottonseed oil, soybean oil, corn oil, linseed oil, menhaden oil, etc. Preferably, the epoxidized compounds contain from about 2 to about 8 epoxy groups per molecule. The compounds are preferably used in amounts ranging from about 0.05 to about 0.5 weight percent.

EXAMPLE 1

A series of compositions of variable additive content was prepared with polyethylene fluff produced with a chromium oxidesilica catalyst containing 1 wt. % chromium. The fluff, having a density of 0.955 g/cc and a melt index of 0.2 (ASTM D 1238-65T, condition E) was mixed with stabilizers, water and an organic aliphatic compound in a Waring Blender at room temperature. Portions of each composition were then extruded at different extrusion temperatures through an electrically heated Brabender extruder having a ¾ inch (1.9 cm) diameter screw. Each extrudate was subsequently compression molded into ¼×2¼ inch (0.6×5.7 cm) discs at 163° C. and the color of each disc in terms of the tristimulus values L, a, and b was measured by means of a Hunter Laboratory Color Difference Meter Model 25DM. For convenience in presenting the results in terms of a single number, the three values were weighted as shown in the equation below:

$$\text{color number} = L(0.0382L - 0.56a - 0.3374b).$$

The lower the number the greater the color.

The composition of each sample employed, the melt temperature it had experienced, and the color numbers are presented in Table 1.

TABLE 1

Effect Of Water And/Or Alcohols On Color Of Molded Polyethylene(d)

| Run No. | Stabilizer, Wt. % BHT(a) | Stabilizer, Wt. % DLTDP(b) | Hydroxy Compound, Wt. Percent Water | Hydroxy Compound, Wt. Percent Glycerol | Hydroxy Compound, Wt. Percent Isopropanol | Extrusion Temp. °C. 232 Color No. | Extrusion Temp. °C. 274 Color No. | Extrusion Temp. °C. 302 Color No. | Remarks |
|---|---|---|---|---|---|---|---|---|---|
| 1 | 0 | 0 | 0 | 0 | 0 | 289 | 290 | 276 | control |
| 2 | 0.05 | 0 | 0 | 0 | 0 | —(c) | 146 | 176 | control |
| 3 | 0.03 | 0.05 | 0 | 0 | 0 | 270 | 219 | 240 | control |
| 4 | 0.03 | 0.05 | 0.4 | 0 | 0 | 292 | — | — | control |
| 5 | 0.03 | 0.05 | 0 | 0.4 | 0 | 292 | — | — | invention |
| 6 | 0.03 | 0.05 | 0 | 0 | 0.4 | 294 | — | — | invention |
| 7 | 0.03 | 0.05 | 0.2 | 0.2 | 0 | 299 | — | — | invention |
| 8 | 0.03 | 0.05 | 0.2 | 0 | 0.2 | 295 | — | — | invention |
| 9 | 0.05 | 0 | 0.4 | 0 | 0 | 245 | — | — | control |
| 10 | 0.05 | 0 | 0 | 0.4 | 0 | 262 | — | — | invention |
| 11 | 0.05 | 0 | 0 | 0 | 0.4 | 272 | — | — | invention |
| 12 | 0.05 | 0 | 0.2 | 0.2 | 0 | 284 | — | — | invention |
| 13 | 0.05 | 0 | 0.2 | 0 | 0.2 | 263 | — | — | invention |

Notes:
(a) 2,6-di-t-butyl-4-methylphenol
(b) dilaurylthiodipropionate
(c) a dash signifies no determination made
(d) The polyethylene was prepared from a commercially available chromium oxide-silica catalyst containing about 1 wt. % chromium calculated as the metal. The ash content was less than 0.05 wt. %. (For reference purposes, Marlex HHM 5502, lot 05-7-0559).

Inspection of the results given in Table 1 in control runs, 1 and 2 reveals that the hindered phenol stabilizer, BHT, significantly contributes to color formation in the polymer samples containing it as evidenced by their lower color numbers. Control run 3 shows that the addition of DLTDP to the stabilizer system results in less color in the molded samples. However, the samples still possess more color than the stabilizer-free samples of control run 1. Invention runs 5 and 6 show that glycerol and isopropanol are equal to or better than water, shown in control run 4, in reducing discoloration in the stabilized samples containing both BHT and DLTDP. In fact, the colors of all the samples of runs 4, 5, and 6, are somewhat better than that of the stabilizer-free samples of control run 1. Invention run 7 shows that the combination of water and glycerol to be somewhat more effective than the combination of water and isopropanol evidenced in invention run 8.

The samples in the remaining runs 9-13 all contained only BHT as the stabilizer. The sample of control run 9 shows a typical color number for a polymer sample given only a water treatment. Invention runs 10 and 11 show that glycerol alone or isopropanol alone are effective treating agents. However, the combination of water and glycerol as shown in invention run 12 is especially effective in minimizing color development.

EXAMPLE 2

A series of compositions of variable additive content was prepared as in the first example by mixing polyethylene fluff produced with two different chromium oxide-silica catalysts, with stabilizers and a normally solid, commercially obtained, epoxy resin designated as Epon 2002 by the Shell Chemical Company. The epoxy resin is stated by Shell to have an epoxide equivalent of 675-825; the grams of resin containing one gram-equivalent of epoxide according to ASTM D 1652 and a Gardner color of 170 maximum as determined in the platinum-cobalt method with 40 wt. % resin contained in methyl ethyl ketone. Each sample contained 0.02 wt. % BHT and 0.03 wt. % DLTDP as stabilizers.

Portions of each composition were extruded at 288° C., converted into compression molded discs, and color determinations made for each disc as described before.

The amount of epoxy resin used, description of the polyethylene used and the results obtained are given in Table 2.

TABLE 2

Effect Of Epoxy Resin On Color Of Molded Polyethylene

| Run No. | Stab., Wt. % BHT | Stab., Wt. % DLTDP | Catalyst Base Silica(a) | Catalyst Base Silica(b) Titania | Epoxy Resin Weight % | Color Number | Remarks |
|---|---|---|---|---|---|---|---|
| 14 | 0 | 0 | NA(c) | Yes | 0 | 290 | control |
| 15 | 0.02 | 0.03 | NA | " | 0 | 208 | " |
| 16 | " | " | NA | " | 0.10 | 275 | invention |
| 17 | " | " | NA | " | 0.25 | 278 | " |
| 18 | " | " | NA | " | 0.75 | 275 | " |
| 19 | 0 | 0 | Yes | NA | 0 | 277 | control |
| 20 | 0.02 | 0.03 | " | NA | 0 | 219 | " |
| 21 | " | " | " | NA | 0.10 | 204 | " |
| 22 | " | " | " | NA | 0.25 | 223 | " |
| 23 | " | " | " | NA | 0.75 | 228 | " |

Notes:
(a, b) Each catalyst is a commercially available material consisting of chromium oxide and silica(a) or chromium oxide and 98 wt. % silica 2 wt. % titania(b). The amount of chromium calculated as the metal in each catalyst is about 1 wt. %. The polyethylene prepared with the catalyst of (a) is described in Example 1. (Also see footnote d, Table 1). The ethylene/1-hexene copolymer prepared with the catalyst of (b) had a density of 0.949 g/cc, a melt index of 0.2, an ash level of 310 ppm, a chromium level (calculated as the metal) of 3 ppm and a titanium level (calculated as the metal) of 5 ppm.
(c) Not analyzed.

The results shown in Table 2 indicate that the epoxy resin employed is primarily of advantage with ethylene polymers prepared in a slurry polymerization process with a catalyst consisting of chromium oxide supported on silica-titania. When such a polymer is stabilized with BHT and DLTDP as in control run 15, the color increases relative to the unstabilized resin of control run 14. When a minor amount of the epoxy resin is admixed with the stabilized resin the results shown in invention runs 16–18 show that color is decreased and it closely approaches that of the unstabilized resin of control run 14.

In contrast, control runs 19–23 employ as the base polymer a material prepared in a slurry polymerization process with a catalyst consisting of chromium oxide supported on titanium-free silica. The same epoxy resin at the same levels employed in invention runs 16–18 was employed in runs 21–23. The relatively low color numbers determined for the molded discs of runs 21–23 indicate that only a negligible amount of improvement was realized.

Resins produced with the aid of chromium oxide supported on silica-titania contain a minor amount of titania and chromium oxide in the recovered polymer. Such polymers can contain from about 2 to about 10 ppm titania calculated as titanium and from about 1 to about 5 ppm chromium oxide calculated as chromium. It is believed that the difference in behavior of the epoxy polymers noted with the polymers used in this Example is due to the very small amounts of the metals remaining in the recovered polymers.

EXAMPLE 3

A series of compositions was prepared by mixing individual samples of ethylene polymer fluff disclosed in footnote b of Table 2 with a hindered phenolic stabilizer, if used, and an epoxidized linseed oil, if used, by employing a Waring Blender at room temperature. Each mixture was extruded at 288° C., converted into compression molded discs and color determinations made for each disc as described before.

The quantities of stabilizer and epoxidized linseed oil and the results obtained are given in Table 3.

TABLE 3

Effect Of Epoxidized Linseed Oil On Color Of Molded Ethylene Polymer

| Run No. | Stabilizer, Wt., % BHT | B(a) | Epoxidized Linseed Oil, Wt. % N(b) | M(c) | Hunter Color Number | Remarks |
|---|---|---|---|---|---|---|
| 24 | 0 | 0 | 0 | 0 | 237 | control |
| 25 | 0.10 | 0 | 0 | 0 | —10 | " |
| 26 | 0 | 0.10 | 0 | 0 | 32 | " |
| 27 | 0 | 0 | 0.20 | 0 | 155 | " |
| 28 | 0 | 0 | 0 | 0.20 | 98 | " |
| 29 | 0.1 | 0 | 0.10 | 0 | 99 | invention |
| 30 | 0.1 | 0 | 0.20 | 0 | 109 | " |
| 31 | 0.1 | 0 | 0.50 | 0 | 97 | " |
| 32 | 0.1 | 0 | 1.00 | 0 | 84 | " |
| 33 | 0 | 0.1 | 0.20 | 0 | 97 | " |
| 34 | 0.1 | 0 | 0 | 0.20 | 52 | control |
| 35 | 0.1 | 0 | 0 | 0.50 | 34 | " |
| 36 | 0.1 | 0 | 0 | 1.00 | 43 | " |

Notes:
(a)tetrakis [methylene (3,5-di-t-butyl-4-hydroxyhydrocinnamate)] methane.
(b)Contains an average of 6.8 epoxy groups per molecule.
(c)Contains an average of 10.4 epoxy groups per molecule.

Inspection of the results presented in Table 3 in control runs 24–28 provides a basis for evaluation the effects of two epoxidized linseed oils of different epoxy group content. Invention runs 29–33 show that the addition of a linseed oil containing an average of about 7 epoxy groups per molecule affords a substantial improvement in color relative to that of the BHT stabilized polymer of control run 25. The effect of the epoxidized oil is fairly constant over a concentration range from 0.1 to 1 wt. % since the color numbers obtained from the discs range from 84 to 109, mostly from 97 to 109. On the other hand, the addition of an epoxidized linseed oil containing an average of about 10 epoxy groups per molecule is shown in control runs 34–36 to be much less effective in preventing discoloration of the stabilized resin. These results suggest that the epoxy group content of epoxidized oils should not exceed about 8 per molecule.

EXAMPLE 4

A series of compositions was prepared by mixing individual portions of ethylene polymer fluff disclosed in footnote b of Table 2 with two different hindered phenolic stabilizers and 0.1 wt. % of a hydroxy compound by employing a Waring Blender at room temperature. Each mixture was extruded at 288° C., converted into compression molded discs and color determinations made for each disc as described before.

The quantities of stabilizers and their description, the identity of each hydroxy compound employed, and the results obtained are presented in Table 4.

TABLE 4

Effect Of Hydroxy Compound On Color Of Molded Ethylene Polymer

| Run No. | Stab., Wt. % BHT | B(a) | Hydroxy Compound, Wt. % Methanol | i-Propanol | t-Butanol | Ethylene Glycol | Glycerol | Pentaerythritol | Color No. | Remarks |
|---|---|---|---|---|---|---|---|---|---|---|
| 37 | 0.015 | 0.085 | —(b) | — | — | — | — | — | 60 | control |
| 38 | " | " | 0.1 | — | — | — | — | — | 77 | invention |
| 39 | " | " | — | 0.1 | — | — | — | — | 83 | " |
| 40 | " | " | — | — | 0.1 | — | — | — | 74 | " |
| 41 | " | " | — | — | — | 0.1 | — | — | 174 | " |
| 42 | " | " | — | — | — | — | 0.1 | — | 212 | " |
| 43 | " | " | — | — | — | — | — | 0.1 | 223 | " |

Notes:
(a)tetrakis [methylene (3,5-di-t-butyl-4-hydroxyhydrocinnamate)] methane.
(b)A dash signifies nothing is added.

The results given in Table 4 indicate that the color improvement afforded by organic aliphatic hydroxy compounds used alone in stabilized ethylene polymers are related to the hydroxyl content of the compounds. The stabilized control polymer has a color number of 60, the baseline for this series. The addition of 0.1 wt. % of each alkanol shown in invention runs 38–40 is effective in increasing the color number from 60 to about 75–85. The same level of ethylene glycol resulted in a color number of 174 for invention run 41, the same level of glycerol resulted in a color number of 212 for invention run 42, and the same level of pentaerythritol resulted in a color number of 233 for invention run 43.

I claim:

1. A method for preparing compositions containing a polymer of ethylene to reduce discoloration upon processing at elevated temperature, said method comprising admixing with a polymer of ethylene produced using chromium oxide catalyst before completion of processing at elevated temperature a combination of compounds consisting essentially of (1) a hindered phenolic stabilizer consisting of carbon, hydrogen and oxygen and (2) at least one compound chosen from the group consisting of methanol, ethanol and isopropanol.

2. A method of claim 1 wherein the polymer of ethylene is admixed with water.

3. A polymer of ethylene prepared according to claim 1.

4. A polymer of ethylene prepared according to claim 2.

5. A method for preparing compositions containing a polymer of ethylene to reduce discoloration upon processing at elevated temperature, said method comprising admixing with a polymer of ethylene produced using chromium oxide catalyst before completion of processing at elevated temperature a combination of compounds consisting essentially of (1) a hindered phenolic stabilizer consisting of carbon, hydrogen and oxygen, (2) water, and (3) glycerol.

6. A method of claim 2 or 5 wherein the weight ratio of water to compound chosen from the group consisting of methanol, ethanol, isopropanol and glycerol is in the range of about 1:10 to about 10:1.

7. A polymer of ethylene prepared according to claim 5.

* * * * *